A. McKINNON.

TRUCK.

APPLICATION FILED APR. 24, 1918.

Reissued Oct. 15, 1918.

14,535.

2 SHEETS—SHEET 1.

Inventor

Allan McKinnon.

by By Henry J. Milley

Atty.

A. McKINNON.

TRUCK.

APPLICATION FILED APR. 24, 1918.

Reissued Oct. 15, 1918.

14,535.

2 SHEETS—SHEET 2.

*Inventor:*
Allan McKinnon
by Henry J. Miller
*Att'y.*

UNITED STATES PATENT OFFICE.

ALLAN McKINNON, OF HOLYOKE, MASSACHUSETTS.

TRUCK.

14,535. Specification of Reissued Letters Patent. Reissued Oct. 15, 1918.

Original No. 1,195,699, dated August 22, 1916, Serial No. 812,554, filed January 16, 1914. Application for reissue filed April 24, 1918. Serial No. 230,612.

*To all whom it may concern:*

Be it known that I, ALLAN McKINNON, a citizen of the United States, and a resident of Holyoke, in the county of Hampden and State of Massachusetts, have invented new and useful Improvements in Trucks, of which the following is a specification, reference being had to the accompanying drawings, forming part thereof.

This invention has reference to improvements in trucks having means to effect a limited elevation of their loads.

One object of the invention is to construct a practical truck having a load carrying platform or means adapted to be introduced beneath the load and then elevated to lift such load sufficiently to permit of its transportation by means of such truck and, to this end, the invention consists in the novel features of construction and combination of parts whereby the positioning of the truck relative to its proposed load is facilitated; whereby the load may be elevated and sustained at any point in its limit of elevation without danger of accidental release and may be sustained at its highest point of elevation against certain shocks and whereby the lowering of the load must of necessity be gradual and without shock.

Other objects of the invention whereby the operation of the load elevating mechanism is effected, particularly in hand trucks, by or through the medium of the draft tongue will appear from the following description.

Figure 1:
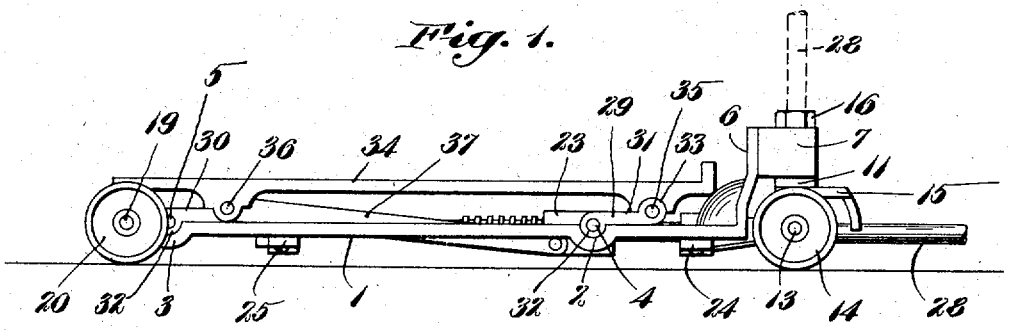
Figure 1 is a side elevation of a hand truck constructed in accordance with the present invention, the dotted lines indicating the position of the draft tongue when not in use.
Figure 2:
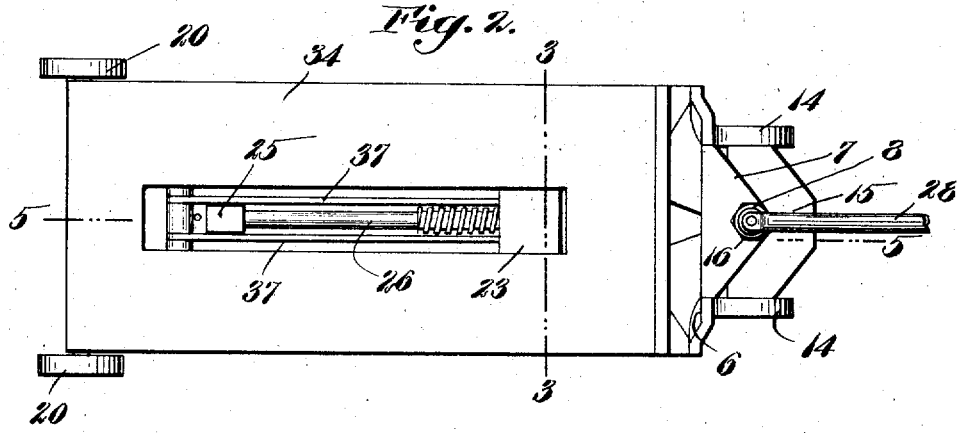
Fig. 2 is a top plan view.
Figure 3:
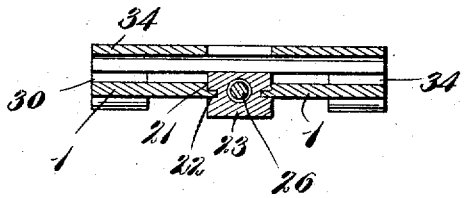
Fig. 3 is a section on the line 3—3 of Fig. 2.

Referring to the drawings by numeral, 1 designates as an entirety the body or frame bed of the truck, which body is of substantial construction and has in its upper surface pairs of concavities 2 and 3 the axes of which are approximately defined by the spindles or pivots 4 and 5 carried by said body 1. At its forward end said body 1 has the upstanding member 6 which carries the head or enlargement 7 having the vertical bore 8 open to the front of said enlargement by reason of the slot 9. In said bore 8 is rotated the slotted spindle 10 of the frame 11 having extensions 12 furnished with spindles 13 on which are rotatably mounted the wheels 14 whereby the forward portion of the truck is supported. Extending from the frame 11 is the lip or member 15 having a slot or other suitable means to receive the draft tongue as will hereinafter be described. Preferably the spindle 10 will have the slotted nut 16. By means of this construction the frame 11 with its wheels 14 may swing to facilitate the movement of the truck in various directions.

Figure 5:
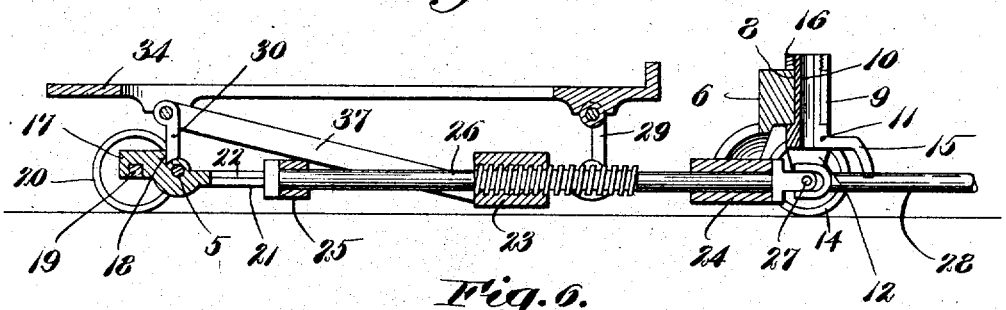
Fig. 5 is a sectional view taken on line 5—5 Fig. 2.
Figure 6:
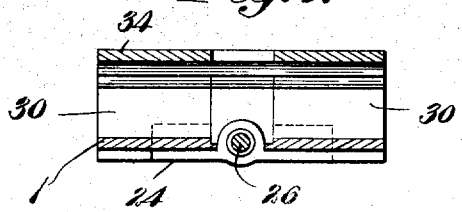
Fig. 6 is a section on the line 6—6 of Fig. 4.
Figure 7:
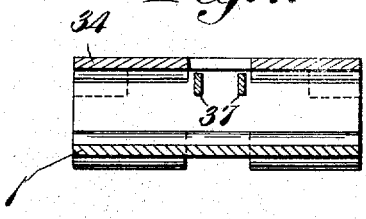
Fig. 7 is a section on the line 7—7 of Fig. 4.

The opposite end of the truck body 1 from that having the upstanding member 6 has the enlargement or member 17 furnished at its end portions with vertical stop faces or shoulders as 18 (Fig. 5). This member 17 carries the axle 19 on the extremities of which the wheels 20 are rotatably mounted.

Extending longitudinally of the body 1 is the opening 21 the edges of which may constitute guides 22 for the grooved portions of block 23 which block has a screw threaded bore.

Journaled in bearings 24, 25 with which the body 1 is supplied is the screw shaft 26 having its screw engaged with the screw threaded bore of block 23 whereby the rotation of said screw effects the traveling of block 23 along said screw which latter is held from longitudinal movement. The forward end of shaft 26 has the joint member 27 which is connected by means of a suitable joint, preferably by a universal joint, with the draft tongue 28 so that the rotation of said draft tongue, even when swung considerably out of alinement with screw shaft 26, may effect the rotation of said screw shaft. The draft tongue 28 may be swung upward and is adapted to be received in the slot of member 15 whereby, when so engaged, the swinging of the draft tongue sidewise will cause the frame 11 with its wheels 14 to swing. It is of course apparent that when said draft tongue 28 is engaged with said plate 15 said tongue 28 is in a position to be operated in order to effect rotation of screw shaft 26. If desired the draft tongue 28 may be swung upward until it is received within the slotted spindle 10 occupying a position substantially at right angles with the screw shaft 26 which, in some cases, where the pitch of the screw of shaft 26 is quite sharp, may be desirable to prevent the rotation of shaft 26 under a reactive pressure brought against block 23. Ordinarily however the pitch of the screw threads of shaft 26 and of the bore of block 23 will be so graduated that reactive movement of said block against any pressure normally expected to be exerted thereagainst will be satisfactorily resisted by the frictional contact between said respective screws and the leverage to be overcome in translating the longitudinal pressure of block 23 to the rotative movement of shaft 26 necessary to permit said block 23 to move longitudinally.

Rotatably seated in the concavities 2 and 3 of the body 1 are pairs of toggle links 29 and 30 which links are of similar shape having the straight shank 31 connecting heads 32 and 33 which have curved walls and extend in opposite directions from a median line of said shank 31 whereby the axes of said heads 32 are offset. The heads 32 of said links 29 and 30 are pivoted on the pivots 4 and 5 of said concavities 2 and 3 so that the straight walls of their shanks may lie against the upper surface of body 1 as shown in Fig. 1. The heads 33 of said links 29 are received by concavities of members of the platform 34 and are pivoted on pivots 35 of said members. The heads 33 of links 30 are pivoted on the shaft 36 mounted in members depending from the rear portion of said platform 34.

Power is transmitted from the slide block 23 to shaft 35 to effect the swinging upward of links 30 by means of the rods 37 which are mounted to swing on said shaft 36 and are pivotally connected to said block 23 at points out of horizontal alinement with the pivots 5 so that the thrust of said rods 37 acts to swing upward the ends of links 30 having the heads 33.

Figure 4:
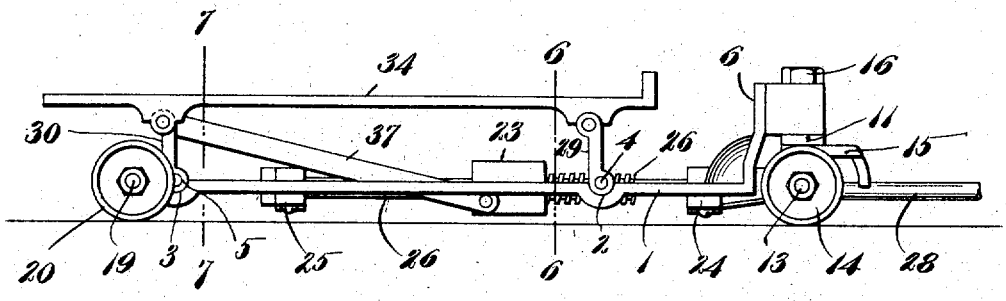
Fig. 4, is a side elevation, the platform being shown in raised or elevated position.

When it is desired to raise the platform 34 from the position shown in Fig. 1 to the position shown in Fig. 4 rotation of screw shaft 26 is effected, preferably by rotating the draft tongue 28, whereby the screw thread of such shaft 26 acts on the screw threaded bore of block 23 to move said block and its rods 37 longitudinally of said shaft 26 whereby the thrust of the rods 37 is exerted against shaft 36 which transmits said thrust to the heads 33 of links 30 thus causing said links to swing on the pivots 5 until said links 30 reach a vertical position in which movement said links 30 will be followed by the links 29 so that the platform 24 is always level which is preferable. When the links 29 and 30 reach the vertical position as shown in Figs. 4 and 5 the links 30 meet the stop faces or shoulders 18 of frame members 17 whereby further swinging movement of said links 30 in that direction is prevented while as the pivots at the upper ends of links 29 and 30 are offset, from the pivots 4 and 5, in the direction of said stop faces 17 the screw 26, block 23 and rods 37 are relieved from a considerable pressure.

Ordinarily the truck with the platform 34 in the position shown in Fig. 1 will be placed beneath the load to be moved or beneath a platform which sustains said load. Screw shaft 26 will then be rotated by means of the tongue 28 or some similar means to move block 26 longitudinally of said shaft 26 and to cause the rods 37 to effect the swinging of links 30 to lift the platform 34 and, ultimately, the load which is taken up by such platform. By reason of the construction herein shown the pitch of the complemental screws of the shaft 26 and block 23 may be so gradual that the platform 34 and its load will be sustained at any point in the limit of movement of said platform ascending or descending so that danger of damage to the truck mechanism or to its load by accidental falling of the platform 34 is eliminated. This easy and positive movement of platform 34 is particularly desirable when the truck has reached the position at which its load is to be deposited as the load can be lowered gradually and accurately into place, a desirable feature when the load consists of a heavy machine.

The coöperation between the links 30 and the stop plates or shoulders 18 is desirable in the resistance offered thereby in overcoming the inertia of the load on platform 34 as the truck is started in its forward movement.

Having thus described my invention I claim as new and desire to secure by Letters Patent.

1. A truck comprising a wheeled truck body embracing a longitudinal opening having guides, a block slidably sustained by said guides, a shaft journaled in bearings carried by said truck body, said shaft extending through said opening and having a screw thread engaged with said block, a load carrying platform superposed on said body, means acting to elevate said platform when moved horizontally, a rigid means pivotally connected with said block and said platform to transmit the thrust of said block in its movement, and means to effect rotation of said shaft.

2. A truck comprising a wheeled truck body having longitudinal guides, a load carrying platform superposed on said truck body and connected therewith by pivoted links whereby said platform at its lowest point of movement is sustained by said links swinging against said truck body, a block slidably sustained by said guides, rigid thrust means pivotally connected with said block and said platform, and means to effect the sliding of said block along said guides and the holding of said block at any point in such sliding movement.

3. A truck comprising a wheeled truck body having a longitudinal opening, a load carrying platform superposed on said body, means to effect elevation of said platform when moved horizontally, a screw power mechanism having a member slidable on said body and extending below the same, and a pair of rigid thrust members pivotally connected with said slidable member below said truck body and with said platform above said body, whereby in the downward movement of said platform said thrust members may operate through said opening to permit said platform to move close to said body.

4. A truck comprising a truck body having a longitudinal opening having a guide, a block slidable on said guide, a platform superposed on said body, a pair of rigid power transmitting members pivotally connected to said block and to said platform, means to effect movement of said block along said guide, and means coöperating with said truck body and platform to raise said platform when said platform moves longitudinally.

5. A truck comprising a truck body having at its forward portion a wheeled member adapted to swing on a vertical axis, a load carrying platform superposed on said truck, links pivoted to said truck and to said platform, a member slidably mounted on said truck, rigid means connecting said slidable member and said platform, a screw cooperating with said latter member to effect sliding thereof, a draft tongue mounted to swing and adapted to effect the swinging of said wheeled member, and a connection between said draft tongue and said screw whereby said screw may be rotated from said tongue.

6. A truck comprising a truck body having at its forward portion a wheeled carriage adapted to swing on a vertical axis; a load carrying platform superposed on said truck; operating means for raising and lowering said platform, said operating means including a rotatable screw extending beneath a portion of said wheeled carriage; and operating means for said screw universally connected to the screw and rotatably received by a member of said wheeled carriage whereby said screw may be operated in any position to which said carriage is adapted to be swung.

7. A truck comprising a truck body and a load carrying platform superposed on said body, links pivotally connected with said truck body and said platform, a screw journaled in bearings of said truck body beneath said platform and having a flexibly connected member forming a draft tongue and an operating device for said screw, a member operated by said screw in two directions, and a rigid means for transmitting motion from said member to said platform to effect movement of said platform in one direction and to resist movement thereof in another direction.

8. A truck comprising a truck body having at its forward portion a wheeled member adapted to swing on a vertical axis, a load carrying platform superposed on said truck, operating means for raising and lowering said platform, said operating means including a rotatable screw extending beneath a portion of said wheeled member, a draft tongue having a universal connection with said screw, and means extending from said wheeled member to engage said tongue whereby the swinging of said tongue may effect the swinging of said wheeled member and the rotation of said tongue may effect operation of the platform operating means.

ALLAN McKINNON.